No. 760,109. PATENTED MAY 17, 1904.
J. P. DONOVAN.
WHEEL TIRE.
APPLICATION FILED JAN. 26, 1904.
NO MODEL. 2 SHEETS—SHEET 1.

Witnesses
F. A. Cutter
A. L. Stevens

Inventor
John P. Donovan,
By Webster, Taft & Tilley
Attorneys

No. 760,109. PATENTED MAY 17, 1904.
J. P. DONOVAN.
WHEEL TIRE.
APPLICATION FILED JAN. 26, 1904.
NO MODEL. 2 SHEETS—SHEET 2.

Witnesses
F. A. Cutter
A. L. Stevens

Inventor
John P. Donovan,
By Webster, Taft & Tilly
Attorneys

No. 760,109. Patented May 17, 1904.

UNITED STATES PATENT OFFICE.

JOHN P. DONOVAN, OF WESTFIELD, MASSACHUSETTS.

WHEEL-TIRE.

SPECIFICATION forming part of Letters Patent No. 760,109, dated May 17, 1904.

Application filed January 26, 1904. Serial No. 190,690. (No model.)

*To all whom it may concern:*

Be it known that I, JOHN P. DONOVAN, a citizen of the United States of America, residing at Westfield, in the county of Hampden and Commonwealth of Massachusetts, have invented a new and useful Wheel-Tire, of which the following is a specification.

My invention relates to improvements in tires for automobile and other vehicle-wheels in which a casing of leather, rubber, or other suitable material is employed to inclose an interior tire structure; and it consists, primarily, of such casing, with fastening means therefor, and, secondarily, of metallic tread-plates, a certain improved interior tire structure, which may include a peculiar device for the attachment of the tire to the rim, and other auxiliary or subsidiary parts, all as hereinafter described and claimed, it being understood that any or all of the secondary members may be omitted; and the object of my improvement is to provide a strong and durable tire which is practically proof against puncture or the evil results therefrom and which possesses the requisite amount of flexibility and elasticity.

A further object is to provide adequate means for fastening the component parts of the tire together when the make-up is such as to require the parts to be so fastened and means for securing the tire to the rim of the wheel. The construction of this tire is such that the same is adapted to resist strain and wear incident to ordinary usage of whatever description, and the metallic tread which may enter into the construction of the tire not only serves to assist in securely uniting the peripheral edges of the casing whether or not there be intermediate filling, but furnishes a metallic tire, as it were, for the wheel which possesses all of the advantages of any metallic tire without the disadvantage of rigidity and inelasticity.

I attain the above-noted objects by the means illustrated in the accompanying drawings, in which—

Figure 1:
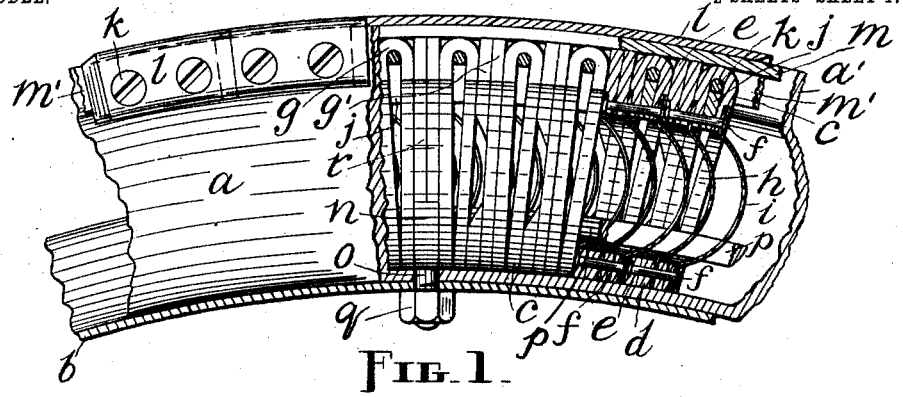
Figure 3:
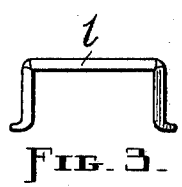
Figure 2:
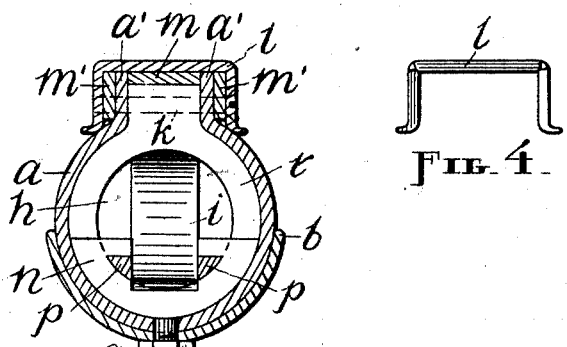
Figure 4:
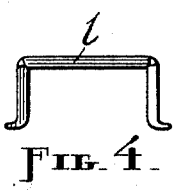
Figure 5:
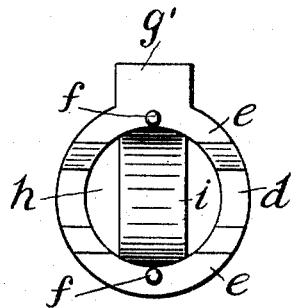
Figure 6:
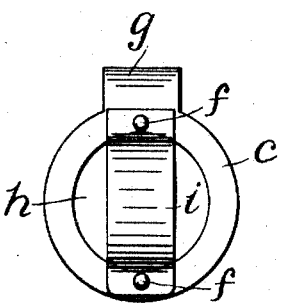
Figure 7:
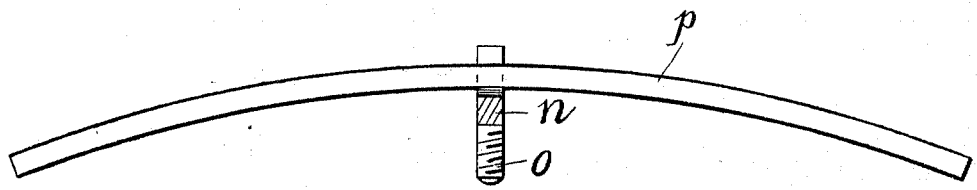
Figure 8:
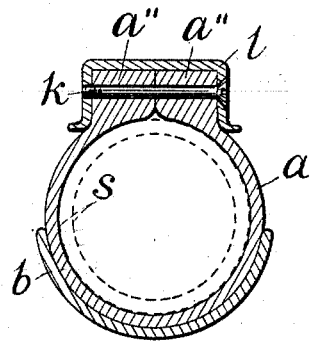
Figure 9:
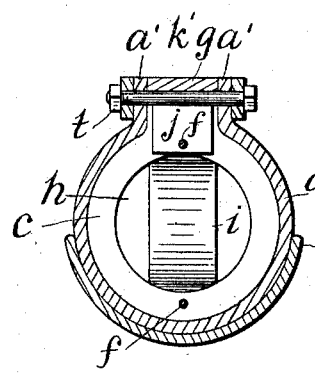
Figure 10:
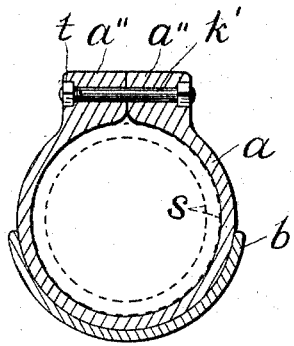
Figure 11:
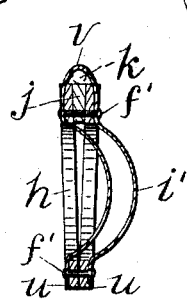

Figure 1 is a side view and partial section of a portion of one form of my tire, the interior tire-forming members being shown in both elevation and section; Fig. 2, a cross-section through the tire; Figs. 3 and 4, opposite end views of one of the tread-plates; Figs. 5 and 6, opposite side views of one of the sections made up of the interior tire-forming members; Fig. 7, a sectional view of a tire-fastener; Fig. 8, a cross-section through a tire made up of my improved casing and tread-plates and an ordinary inflatable tube, such tube being inclosed by said casing; Fig. 9, a cross-section through a tire having a leather casing in which the metallic tread is omitted; Fig. 10, a cross-section through a tire having a rubber casing in which the metallic tread is omitted; and Fig. 11, a sectional view of a pair of rings which may be substituted for the double ring, the loop connecting the two parts of the double spring here provided and attached to said rings serving the same purpose as the double-ring loop.

Similar letters refer to similar parts throughout the several views.

Generally speaking, my invention consists of some suitable structure, as a pneumatic tube or a multiplicity of perforated yielding interior tire-forming members provided with springs similar to those shown and described in my patent of May 26, 1903, No. 729,144, an outer casing open or separable clear around the periphery, and whatever fastening means may be required for the casing. A broken metallic tread adapted to inclose or embrace the peripheral edges of the casing may be added to the foregoing, also means to closely unite the parts and secure the tire to the rim. The perforated yielding interior tire-forming members herein shown and described are modified somewhat from those shown in the aforesaid patent and therein termed "plates;" but such modification does not affect the main characteristics of said plates or members, being required simply for the purpose of better adapting them to the present construction.

In order to meet the requirements of rims of different shapes and sizes, sustain greater or less loads, and withstand various kinds of strains, it will be necessary to alter the shape and size of the interior tire-forming members, to make departures in the nature of some or all of the fastening means or devices, and to otherwise change the construction, and I seek to include and cover all modifications and mechanical equivalents which fall within the scope of my invention.

I will now proceed to describe the invention in detail, referring first to the first seven views. A sheath or casing *a*, of leather, rubber, or other suitable material, having a generally circular body portion in cross-section adapted to be received into a rim *b* and having its edges extending outward from such body portion in straight lines in cross-section is provided. The material of which the casing *a* is composed should be of sufficient thickness or toughness, or both, to protect the interior member or members to a greater or less degree, according to the nature of the same and the consequent amount of protection required, and at the same time the casing must possess sufficient flexibility. If the interior of the tire is to be made up of a multiplicity of members in the form of rings or parts of rings adapted to be accommodated to a rim crosswise, these members are preferably formed into sections before being introduced into the casing in the following manner: A double ring *c* has a single ring *d* and two segments *e* connected or united therewith by means of rivets *f f*, the ring *d* being interposed between said double ring and said segments and the two members of the double ring being connected by an ear or loop *g*. A comparatively large opening *h* extends through the section thus formed, and two bow-springs *i* traverse said opening, being attached by the rivets *f* to the double ring *c*. The springs *i* follow approximately the directions of corresponding wheel-radii. In order to secure the necessary amount of curvature, I may separate those portions of each double ring *c* which are adjacent the loop *g* by means of a washer *j*, through which one of the rivets *f* may pass. The washers *j* not only separate the outer or looped parts of the double rings *c*, but also prevent any possibility of contact between the screws *k*, which pass through the loops *g* and adjacent rivets *f*. Both the ring *d* and the outer segment *e* are provided with ears *g'* similar in general size and shape to the loops *g*. The object in using two segments *e* in place of another ring similar to *d* is to permit all of the sections made up in the manner above described to yield toward the center of the wheel in the same manner and each in the same relative place. A similar result will be obtained by substituting a ring for the two segments *e* which has been grooved or cut out across its exposed face in a horizontal direction, the thin portions corresponding with the spaces between the adjacent ends of the segments. More than one ring *d* may be used in a section, or the section formation may be otherwise modified or omitted altogether. The number and arrangement of the springs may vary considerably. The circular parts of the sections just described or the units which enter into the same fill the corresponding portion of the casing *a*, and the loops *g* and ears *g'* project between the substantially parallel outturned edges *a' a'* of said casing, approximately filling the space therebetween. A series of trough-shaped tread-plates of steel or other suitable material is provided, and these plates (designated by *l*) are adapted to fit over the peripherale dges *a'* and the ends of the loops *g* and ears *g'*, and the parts are securely fastened together by means of bolts or screws *k*, passing through the loops *g*, said edges *a'*, and the sides of said plates. If required, a filling-strip *m* of leather or other suitable material may be introduced between the ends of the loops *g* and ears *g'* and the inner faces of the tread portions of the plates *l*, and similar filling-strips *m' m'* may be introduced between the outside faces of the edges *a'* and the inside faces of the sides of the plates *l*. It will be readily seen that more or less filling may be required at these points under different conditions, or perhaps none at all. By preference one end of each plate *l* should be externally chamfered and the opposite end of the same plate internally chamfered, so that adjacent plates can interlock and still have some little movement in relation one with another. As a convenient means of holding the inner portions of the ring-sections in place and securely fastening the tire to the rim a metallic fastener comprising a segment *n*, a threaded stem *o*, and two retaining-rods *p* may be employed. The retaining-rods *p* are integral with or rigidly secured intermediate of their ends to the segment *n* and are adapted to pass through the section or ring openings *h* and embrace with their adjacent plane sides the springs *i* and with their curved sides bear against the ring members, thus securely wedging and holding the latter in place. The stem *o* passes through suitable openings in the casing *a* and the rim *b*, and a nut *q*, screwed onto the protruding end of said stem and tightened against said rim, securely holds the adjacent parts to the rim. A number of fastening devices similar to the one above described is required for the complete tire, such devices being arranged at intervals, so as to enable the plurality of rods *p p* to form complete circles. Two mutilated rings or segments *r* are employed to fill the space between the two double rings *c*, which are adjacent the segment *n*, said segments *r* being similar to the rings *d* if such rings had their inner portions cut off, or one of the segments *r* may be made like one of the outer segments *e*.

In assembling this tire the casing *a* is first placed in the rim *b* and the ends of said casing united in any suitable manner, as by skiving or chamfering them, so that they will overlap. Next the fastening devices and ring members are placed in position and finally the tread-plates. After all of the screws and nuts have been positioned and tightened the tire is complete and presents a structure which may be said to be almost indestructible.

For the sake of lightness and in order to obtain more flexibility, the interior structure just described in detail may have omitted from it a certain number of sections or ring members—every alternate section, for example—as it is not imperative that such structure be continuous, in which event certain of the screws $k$ will pass through only the edges $a'$, the sides of the tread-plates, and the intermediate filling. This arrangement is also possible when no tread-plates are used, provided the intervals in the interior structure are not too great.

In Fig. 9 I show a tire without the tread-plates, bolts and nuts, as $k'$ and $t$, taking the place of the screws $k$. There need be no material difference in construction between this tire and the one already fully explained except in the omission of the tread-plates.

Referring to Fig. 8, it will be seen that a pneumatic tube (represented by the dotted lines $s$) is inclosed within a casing $a$, of rubber, which has wide or thick edges $a''\ a''$, adapted in cross-section to fill the space within a tread-plate $l$. The screws $k$ pass through the thickened edges $a''$ and the sides of the tread-plates, as before. A leather casing may be used in place of rubber, however, and filling material substituted for the thickened edges $a''$. Any of the well-known means suitable for the purpose may be employed for attaching the tire shown in Fig. 8 to the rim.

The Fig. 8 construction without tread-plates is illustrated in Fig. 10, the nut $t$ and the head of the bolt $k'$ being countersunk.

In place of a double ring $c$ two single rings $u$ may be used with a double spring $i'$, attached thereto by rivets $f'\ f'$, the loop $v$, which connects the two parts of the double spring, being adapted to take the place of the loop $g$ and receive a bolt or screw, as $k$. By using longer rivets this device may be made up with other members into sections.

What I claim as my invention, and desire to secure by Letters Patent, is—

1. The combination with an interior tire structure consisting in part of looped portions, of an exterior casing divided peripherally, and means for securing the divided parts of the casing and the looped portions of the tire structure together.

2. The combination with an interior tire structure consisting in part of looped portions, of an exterior casing divided peripherally, the divided parts of the casing embracing the aforesaid looped portions of the interior tire structure, and means for fastening together the looped portions and said divided parts.

3. The combination with the interior tire structure, of an exterior casing having separable outturned peripheral edges, and means passing through the tire structure and outturned peripheral edges to secure said casing in place about said structure.

4. The combination with the interior tire structure, of an exterior casing separable peripherally, tread-plates secured to the peripheral portions of said casing, and means passing through the tire structure, exterior casing and tread-plates to attach the parts together.

5. The combination with the interior tire structure, of an exterior casing having outturned peripheral edges, tread-plates adapted to receive such edges, and means passing through the tire structure, outturned peripheral edges of the exterior casing and side portions of the tread-plates to attach the parts together.

6. The combination with the interior tire structure, of an exterior casing, and tread-plates having chamfered ends secured to the periphery of said casing, said plates being adapted to have relative movement one with another.

7. The combination with an interior tire structure provided with loops, of an exterior casing, and means directly engaging said loops to fasten said casing and said tire structure together.

8. As an improved article of manufacture, a wheel-tire double ring of yielding material having its parts connected by a loop, and a spring attached to said double ring and arranged across the opening therein in the direction of a wheel radius.

9. As an improved article of manufacture, a wheel-tire perforated section comprising a plurality of united wheel-tire-forming members with a spring or springs arranged across the opening in said section in the direction of a wheel radius or radii and attached to one of said members, one face of said section being cut away or weakened.

10. A wheel-tire comprising a multiplicity of ring and spring members certain of which are provided with loops, an outer casing, and means for engaging and fastening said loops to said casing.

11. A wheel-tire comprising a multiplicity of ring and spring members certain of which are provided with loops, an outer casing opening peripherally, tread-plates adapted to close the peripheral opening in said casing, and fastening means engaging said loops and said tread-plates.

12. The combination with a tire and a rim, of means for attaching the former to the latter, comprising a segment adapted to be secured to said rim crosswise, and laterally-extending retaining-rods fixedly attached to said segment and adapted to engage said tire.

13. The combination with a wheel-rim, of a tire comprising a multiplicity of yielding ring members provided with springs extending in the directions of the wheel-radii, a segment adapted with said ring members to form part of the tire and provided with laterally-extending retaining-rods adapted to embrace said springs and engage the ring members, and means to attach said segment to said rim.

In testimony whereof I have signed my name to this specification in the presence of two subscribing witnesses.

JOHN P. DONOVAN.

Witnesses:
C. F. DONOVAN,
F. A. CUTTER.